Sept. 20, 1955     A. F. BROZ     2,718,372
GATE VALVE
Filed Dec. 8, 1951     3 Sheets-Sheet 1
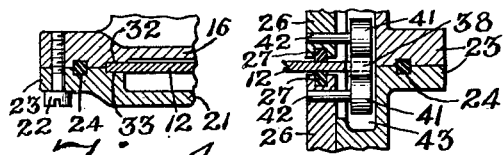
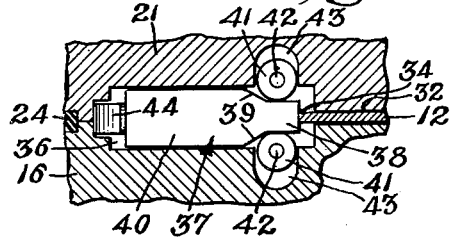
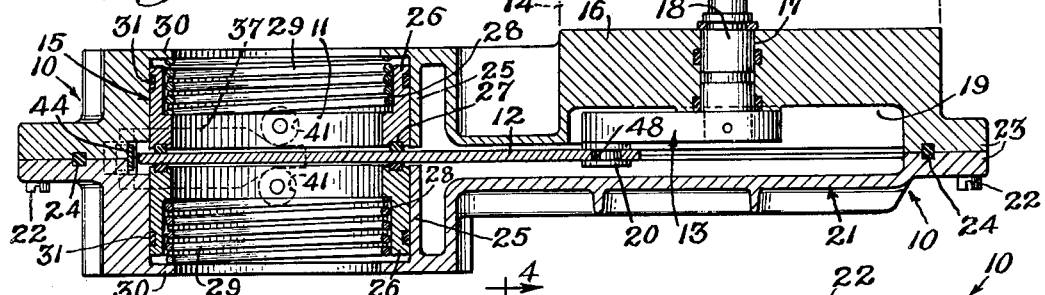
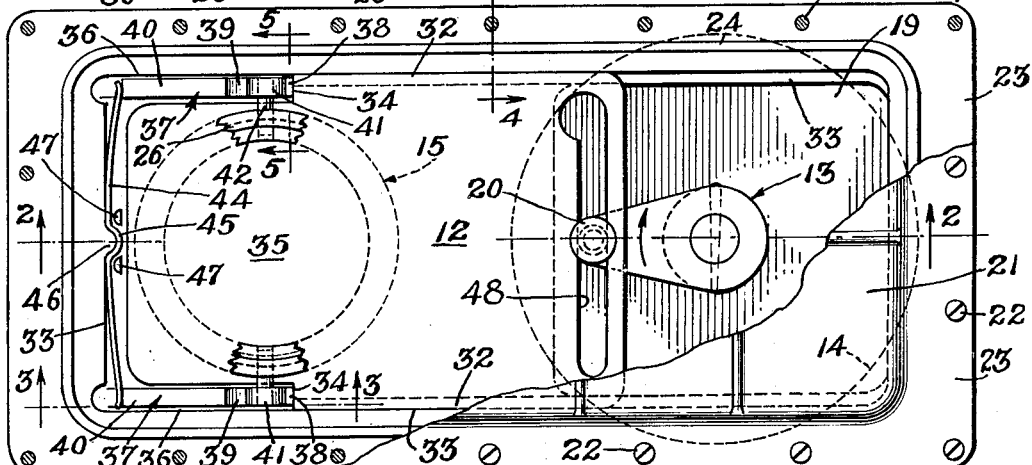
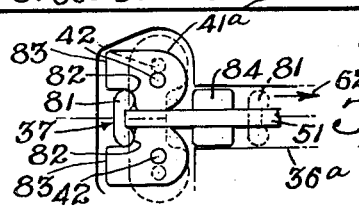
INVENTOR.
ALBERT F. BROZ
BY Lynn Latta
—ATTORNEY—

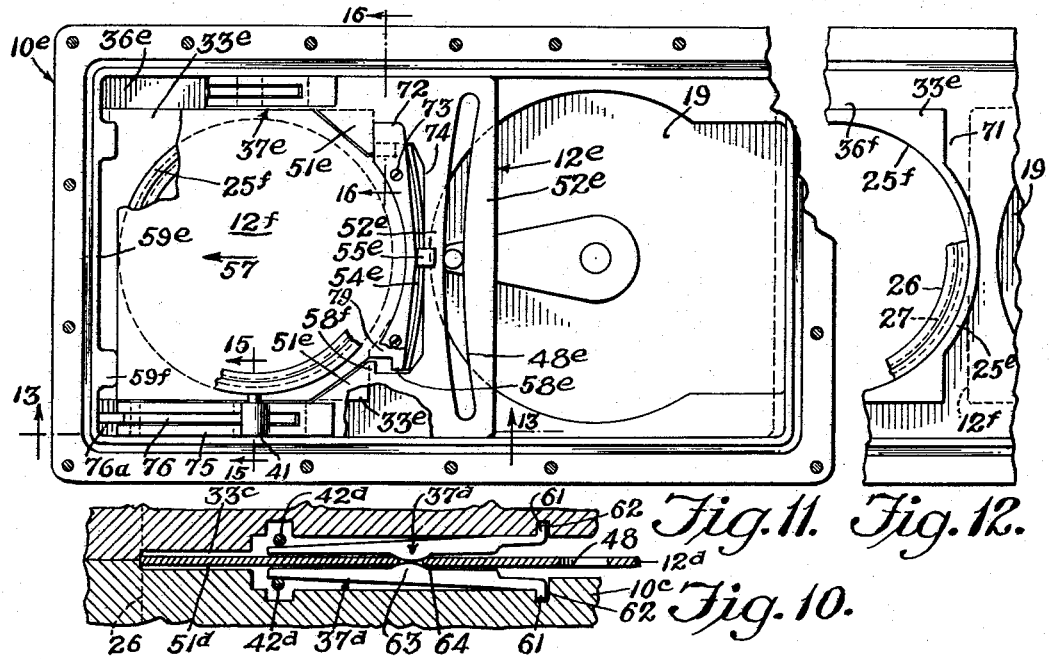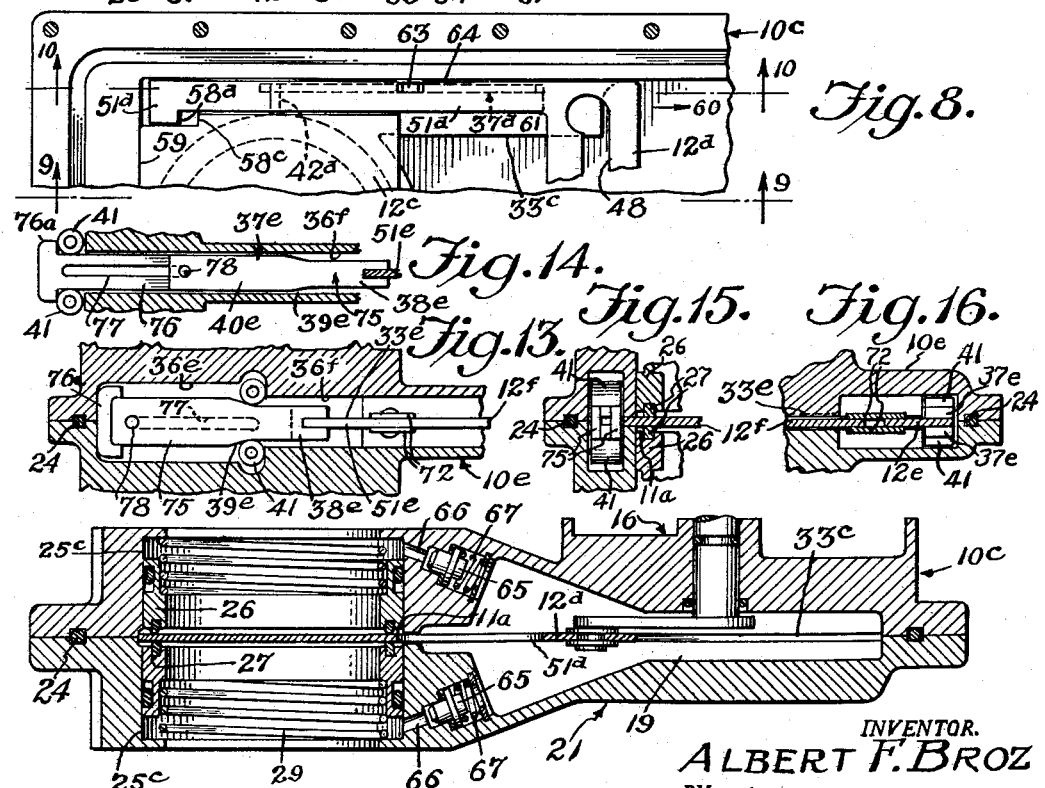

Sept. 20, 1955 A. F. BROZ 2,718,372
GATE VALVE
Filed Dec. 8, 1951 3 Sheets-Sheet 3
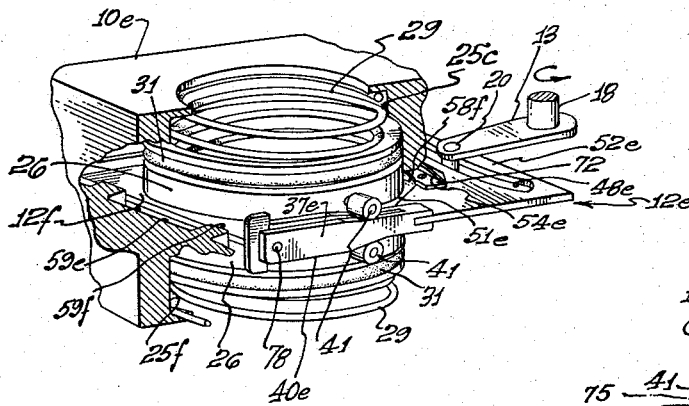
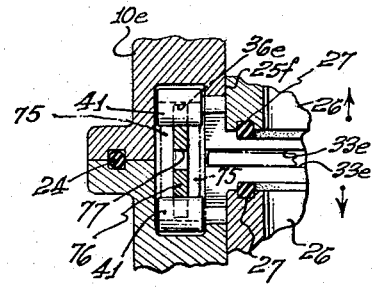
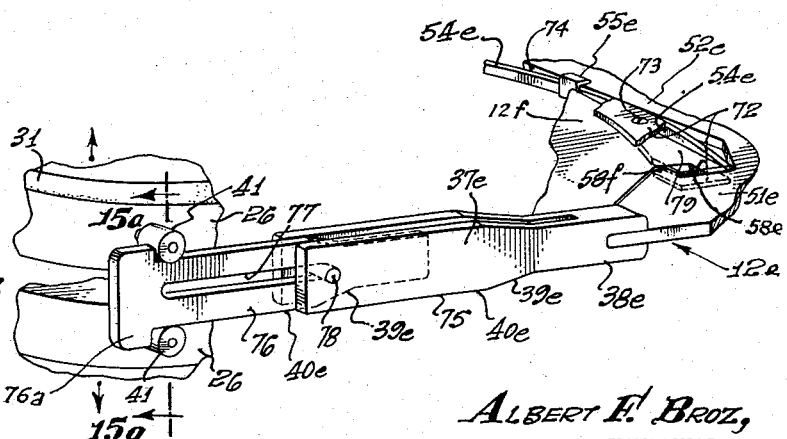
ALBERT F. BROZ,
INVENTOR.
BY William C. Babcock
ATTORNEY.

United States Patent Office 2,718,372
Patented Sept. 20, 1955

2,718,372
GATE VALVE

Albert F. Broz, Woodland Hills, Calif.

Application December 8, 1951, Serial No. 260,603

7 Claims. (Cl. 251—174)

This invention relates to gate valves and has as its general object to provide an improved gate valve which attains an axial separation between the valve gate and its seat or seats as the gate is moved radially out of the valve throat.

It has hitherto been proposed to provide for axial separation between a gate valve and seat by imparting to the valve gate, in its early stage of unseating radial movement, an axial component of movement which bodily lifts it off the seat and avoids the abrasive action of radial sliding of the gate against the seat. This is particularly important in valves utilizing a seat of compressible material such as soft rubber or synthetic rubber, since such material tends to cling to the surfaces of the gate and to be damaged by any dragging of the gate across the seat. The general object, accordingly, in valves of the general type under consideration, is to avoid rapid deterioration of the valve seat from the abrasive action of the gate thereon. In the earlier proposals in which the gate is moved both radially and axially, very difficult problems in the handling of the complex movement of the gate, are encountered. The present invention aims generally to avoid these problems by utilizing an arrangement in which the gate has a purely radial movement and in which the valve seat or seats are caused to shift axially away from the gate in the initial stage of opening movement of the gate or its actuator, and to shift axially back into engagement with the gate in the terminal stage of valve closing movement. One of the primary objects of the invention is to attain the advantages of the axial separation of gate and seat, in a relatively simple and inexpensive valve structure.

In one of its embodiments, the invention provides the combination of axially shiftable valve seats and a valve gate in the form of a simple flat plate arranged for purely radial sliding movements and controlling the spreading movement of the seats.

In another embodiment, the invention provides a combination of axially shiftable seats, a radially slidable valve gate, and an actuator yoke having lost motion connections respectively with the gate and with valve seat actuators, such that during an initial stage of opening movement, the valve seat actuators will be energized to spread the seats while the gate remains stationary, and in a subsequent stage of opening movement, the gate will be shifted radially to an open position; whereas there will be a reversal of these actions in the closing of the valve.

A specific object of the invention is to provide an arrangement of axially shiftable valve seats, radially shiftable valve gate, a common actuator for both the seats and the gate, and seat actuator means energized during an initial stage of actuator movement, either through the valve gate or directly through the actuator yoke, for spreading the valve seats at the beginning of a valve opening operation. In one specific embodiment, the invention provides such an arrangement employing novel seat actuator means in the form of a pair of wedges, slidable parallel to the path of sliding movement of the valve gate, controlled by the valve gate or the valve actuator, and engageable with projections from the valve seat carrying sleeves for spreading them apart in the initial stage of valve opening movement. In another specific embodiment, the invention provides, in the general arrangement referred to above, valve seat actuators in the form of pairs of levers cammed apart by the valve gate actuator at the beginning of opening movement thereof.

Other and more general objects of the invention are to provide a valve of the nature specified above, of fairly dependable and positive operation, durable construction, not unduly complicated, and readily serviced.

Other objects will become apparent in the ensuing specifications and appended drawings in which:

Fig. 1 is a plan view of a valve unit embodying the invention, with parts broken away to better illustrate the construction thereof;

Fig. 2 is an axial sectional view thereof;

Fig. 3 is a detail sectional view taken on the line 3—3 of Fig. 1;

Fig. 4 is a detail sectional view taken on the line 4—4 of Fig. 1;

Fig. 5 is a detail sectional view taken on the line 5—5 of Fig. 1;

Fig. 6 is a fragmentary plan view of a valve embodying a modified form of the invention, with cover removed;

Fig. 7 is a sectional view taken on line 7—7 of Fig. 6;

Fig. 7a is a detail taken on the line 7a—7a of Fig. 6;

Fig. 8 is a plan view of a valve embodying another modified form of the invention;

Fig. 9 is an axial sectional view taken on line 9—9 of Fig. 8;

Fig. 10 is a detail sectional view taken on line 10—10 of Fig. 8;

Fig. 11 is a plan view of another modified form of the valve;

Fig. 12 is an inverted plan view of a portion of the casing thereof;

Fig. 13 is a sectional view taken on line 13—13 of Fig. 11;

Fig. 14 is a sectional view also taken on line 13—13, showing the seat spreader in an extended position;

Fig. 15 is a sectional view taken on line 15—15 of Fig. 11;

Fig. 15a is a partial vertical, cross-sectional view taken on line 15a—15a of Figure 18;

Fig. 16 is a sectional view taken on line 16—16 of Fig. 11;

Fig. 17 is a fragmentary, partially vertically sectioned perspective view of the valve shown in Fig. 11;

Fig. 18 is a partial perspective view of the device showing the relationship of its parts in the closed position of the valve; and, Fig. 18a is a view similar to Fig. 18 and showing the relationship of parts in the open position of the valve.

The valve shown in Figs. 1–5

As an example of one form in which the invention may be embodied, I have shown in the drawings a valve comprising, in general, a casing 10 having a portion thereof adapted to function as a short section of a fluid conduit, defining a fluid passage 11; a valve gate 12 disposed in a plane at right angles to the axis of conduit 11 and longitudinally shiftable in its own plane from the closed position shown in the drawing, traversing the passage 11, to an open position withdrawn from the conduit 11; an actuator crank or eccentric 13 for transmitting sliding movement to the gate 12 from a suitable servomotor 14; and a pair of valve seat units 15 adapted to seat against the gate 12 in the closed position of the latter, to seal the same to the conduit 11.

The arm of crank 13 carries at its swinging end a flanged roller 20 which is engaged in a transverse slot 48 in the adjacent end of gate 12.

The valve casing is in two sections (e. g. castings) one of which comprises a motor base 16 to which motor 14 is adapted to be mounted, the base 16 having a bearing bore 17 in which a trunnion 18 of crank 13 is journalled, and having on its inner side a recess which cooperates with a cover plate 21 to define a crank chamber 19 accommodating the crank arm of actuator crank 13. The other casing section comprises cover plate 21 which is attached to the motor base 16 in any suitable manner as by means of cap screws 22, the two casing sections having respective flanges 23 which are secured together in face to face, sealed contact by cap screws 22, with a sealing gasket 24 interposed between flanges 23.

Casing 10 is oblong, crank chamber 19 being formed in one end half thereof and the other end half thereof being formed, in the respective casing sections, with aligned cylindrical duct sections 25, in which are mounted the valve seat units 15. Valve seat units 15 comprise sleeves 26, having opposed annular end channels in which are seated compressible resilient annular valve seats 27, for seating against the opposite flat faces of valve gate 12. In counter bores 28 in the outer portions of sleeves 26 are disposed coil springs 29, each engaged under compression between a shoulder defining the base of a respective counter bore 28 and a flange 30 projecting radially inwardly from a respective duct casing 25 at the outer face of the respective casing section. It will now be apparent that the respective valve seats 27 are constantly biased toward seating engagement with valve gate 12. Sleeves 26 are sealed to the cylindrical inner walls of duct casings 25 by means of packing rings 31 disposed in annular external channels in sleeves 26.

Valve gate 12 has parallel slide portions 32 which are slidably mounted in ways 33 (Figs. 1 and 4) defined between the respective casing sections 16, 21. Slide portions 32 terminate in shoulders 34 in the form of offsets between portions 32 and a narrow end portion 35 of gate 12 which is of sufficient width to fully cover valve seats 27 but has its side margins spaced away from the inner side walls of casing 10, thus defining pockets 36 extending from extremities of ways 33 to the adjacent end of casing 10. In the pockets 36 are slidably mounted a pair of wedges 37 (Fig. 3) for spreading the valve seat units 15 apart. Each wedge 37 has a narrow entering or pilot 38 at its inner end, a pair of intermediate ramps 39 flaring away from pilot 38, and a wide body portion 40 with parallel sides. Wedge 37 operates between a pair of rollers 41 journalled upon studs 42 projecting diametrically from opposite sides of respective valve seat sleeves 26 and anchored therein. Pockets 36 are widened opposite rollers 41 to provide recesses 43 of sufficient depth to accommodate said rollers 41 when they are spread apart by the insertion of the wider body portion 40 of wedge 37 therebetween.

Wedges 37 are urged in roller spreading direction by a leaf spring 44 having a dimpled central portion 45 engaged between lugs 46 and 47 in casing 10, and having respective opposed arms extending into pockets 36 and resiliently engaging the heels of the respective wedges 37. Spring 44 is stressed to exert pressure against the respective wedges, sufficiently to move wedges 37 between rollers 41 overcoming the opposing component of the spring loading sleeves 29, developed in wedges 37 by reaction of rollers 41 against ramps 39. Pilots 38 engage the ends of pockets 36 to arrest the movement of the wedges.

Pilot ends 38 of the respective wedges engage shoulders 34 of gate 12 to position the wedges in accordance with the position of the gate 12 in the initial stage of opening movement and the final stage of closing movement thereof.

*Operation of valve of Figs. 1–5*

In the operation of the valve shown in Figs. 1–5, rotation is transmitted from servomotor 14 to crank 13. As crank 13 rotates, it will retract gate 12 away from duct passage 11. In the initial stage of such retracting movement, wedges 37 will be advanced by spring 44 to bring ramps 39 thereof immediately into engagement with rollers 41, spreading the rollers and thereby moving seat sleeves 26 apart. Accordingly, valve seats 27 will, by axially spreading movement, disengage from the respective faces of gate 12 substantially at the beginning of the retracting movement of the gate, and the ensuing movement of gate 12 will be free of contact with seats 27. Wedges 37 will continue to spread sleeves 26 until the wider body portions 40 thereof have entered between rollers 41. During such spreading movement, springs 29 will be further compressed.

In closing the valve, servomotor 14, which is a reversible motor, is actuated in the opposite direction to swing crank 13 in the direction to move gate 12 toward passage 11. As the gate advances in its terminal stage of closing movement, it will engage and push ahead of it the wedges 37, which will be thereby withdrawn from between the rollers 41, in the final stage of closing movement, allowing sleeves 26 to return toward each other, bringing valve seat 27 into sealing engagement with gate 12 at the end of the valve closing movement.

*Modified form of Figs. 6, 7*

In Figs. 6 and 7 I have shown a modification of the above described valve, in which parts corresponding to previously described parts are referred to by the same reference numerals, and analogous parts of modified form are referred to by similar reference numerals having exponent letters. In this modified valve, the valve gate is in two sections, namely a closure section 12a and a yoke section 12b in which closure section 12a is slidably mounted with a lost motion connection between the two. Yoke section 12b is of U-shape, having parallel side arms 51 joined by a transverse web portion 52 which has the slot 48 therein. Closure section 12a may consist simply in a flat rectangular plate having parallel side margins slidably mounted in ways 53 in arms 51. A bow spring 54, with its central portion secured to closure member 12a as by means of a screw 55, has its ends pressed against shoulders defined at the ends of notches 56 in arms 51; and it stressed so as to urge the closure plate 12a in the direction indicated by arrow 57 thus to cause closure plate 12a to remain stationary in the closed position while yoke section 12e retracts away from it in the initial stage of valve opening movement. Separation of the two gate sections is limited by engagement of pins 58, mounted in closure plate 12a, against the ends of notches 56 opposite the ends engaged by bow spring 54. The closed position of closure plate 12a is determined by engagement of its outer end against end wall 59 of the valve housing 10, bowing the spring 54.

Arms 51 are slidably mounted in ways 33a defined between casing sections 16, 21.

Seat spreading actuator mechanism 37a embodies actuator heads 81 on the ends of yoke arms 51, heads 81 projecting parallel to the valve throat axis, for engagement with cams 41a rotatably mounted on the studs 42 which are secured in and project radially from valve seat sleeves 26. Each cam 41a has a notch 82 to receive a head 81, the latter meshing in notches 82 and transmitting rotation to cams 41a with a modified rack and pinion action, such that as heads 81 move linearly (in the initial stage of opening movement of yoke section 12b) from the starting position (of initial contact with cams 41a) shown in full lines in Fig. 7 to positions where they separate from cams 41a, cams 41a will be cammed apart so as to unseat the valve seats. Limit positions of cams 41a are by interengagement of squared ends 83 of cams 41a, as indicated by the dotted lines in Fig. 7a. Such interengagement maintains the valve seats in spread positions and the cams 41a in positions to receive head 81 in the final stage of valve closing movement of yoke section 12b. At the end of the valve closing movement the valve seats are seated by the action of heads 81 in notches 82.

The outer ends of arms 51 are guided by the engagement of slide shoes 84, secured to the respective faces thereof, against parallel bottom walls of actuator pockets 36a. Thus the heads 81 are fully supported in positions centered between cams 41a for accurate entry of the heads between the cams and for equal distribution of the spreading movement to both valve seats.

In the operation of this modified form of the valve, the initial stage of valve opening movement will be characterized by retracting movement of yoke section 12b as indicated by arrow 60, with closure section 12a remaining stationary, pressed against end wall 59 by the yielding pressure of bow spring 54. Actuator means 37a, energized by the movement of yoke 12b, will spread the valve seats while closure plate 12a remains stationary. After the valve seats have been moved completely out of contact with closure plate 12a, the latter will be picked up by the engagement of the ends of notches 56 against pins 58, and thereafter closure plate 12a will be moved in unison with yoke 12b, to whatever position of opening is determined by the actuation of the valve.

In the return movement of yoke 12b in valve closing direction, closure plate 12a will move in unison with yoke 12b, with pins 58 pressed against the ends of notches 56, until the outer end of closure plate 12a engages wall 59, whereupon the closure plate 12a, having reached its fully closed position, will be arrested in that position while yoke 12b continues to move in valve closing direction so that its arms 51 will actuate spreaders 37a and retract the latter to allow the spring urged seating of the valve seats against closure plate 12a, exactly as in the form of the invention shown in Figs. 1–5.

The valve of Figs. 8–10

Figs. 8–10 illustrate a further modification of the invention embodying a lost motion connection between a closure section 12c and a valve actuator yoke section 12d of the valve gate, yoke section 12d having arms 51d embracing closure plate 12c, and having a lost motion connection therewith for actuating the same in a manner similar to that described in the valve of Figs. 6, 7. Such lost motion connection comprises lugs 58d projecting inwardly from the ends of arms 51d and engageable with shoulders 58c on closure section 12c, said shoulders being defined by notches in the outer corners of closure section 12c. Yoke section 12d and closure section 12c are of flat plate construction and are disposed in a common plane, with the side marginal portions of both sections slidably guided between ways 33c in casing 10c. The two sections are provided with suitable spring loading means such as the bow spring 54e of Fig. 11, hereinafter described for yieldingly biasing them for separating movement.

Instead of the valve seat actuator wedges 37 of the previous forms of the invention, the valve of Figs. 8–10 utilizes pairs of opposed actuator levers 37d between which yoke arms 51d are slidable. Each of the levers 37d has at one end a finger 61 fulcrumed in a recess 62 in a respective casing section, and has its opposite end engaged against a stud 42d secured in and projecting radially from a respective valve seat sleeve 26. Each lever 37d has, intermediate its end, a trapezoidal camming lug 63 receivable in a slot 64 in the arm 51d which is embraced between the pair of levers. An inclined side of each lug 63 defines a camming ramp against which an extremity of slot 64 is adapted to engage so as to force the levers 37d apart as yoke 12d is retracted in valve opening direction 60. Thus in the beginning stage of valve opening movement, the levers 37d are spread so as to shift the valve seat sleeves 26 axially apart.

Pressure relief valves 65 of poppet type, for establishing a maximum limit on the differential of upstream valve throat pressure over downstream valve throat pressure, are positioned to normally close pressure release ports 66 opening into chamber 19 from the respective valve throat cylinders 25c. Valve poppets 65 are loaded by coil springs 67 to a preselected loading.

Pressure relief valves 65—67 are set to relieve pressure in the upstream valve throat when such pressure reaches an intermediate value approaching a selected maximum. For example, if the pressure differential is to be limited to a maximum of 100 p. s. i. (pounds per square inch), the relief valves may be set to open at 80 p. s. i. Pressure will then rise in chamber 19 (with a corresponding further rise in the upstream valve throat) until pressure in chamber 19 reaches a value of 20 p. s. i. and pressure in the upstream valve throat reaches the maximum limit of 100 p. s. i. As the pressure rises in chamber 19 due to the passage of fluid thereto from the upstream relief valve, said fluid will bleed from chamber 19 into the annular space 11a (Figs. 9 and 15) between the walls of cylinder 25c, the ends of sleeves 26, and valve seat gaskets 27. As is apparent, bleeding from chamber 19 into space 11a is possible because there is no fluid seal therebetween, the only obstruction to such bleeding being closure plate 12c slidably supported between casing sections 16 and 21. The sliding clearance between the closure plate and said sections will permit bleeding into space 11c until pressure therein and in chamber 19 reaches a value of 20 p. s. i. and pressure in the upstream valve throat reaches the maximum of 100 p. s. i., as previously stated. At this point, the pressure in chamber 19 applied against the marginal portion of the end of the sleeve 26 of the downstream valve seat, outwardly of the valve seat gasket 27 thereof, will unseat said downstream valve seat and relieve excess pressure into the downstream throat. Springs 29 are relatively light springs, yielding under the pressure differential of, e. g. 20 p. s. i., applied as stated.

Operation of valve of Figs. 8–10

In the operation of the valve of Figs. 8–10, valve gate closure section 12c is spring urged by its spring loading means toward a projected, normal position determined by the limiting action of stop means 58c, 58d. In its closed position shown in Fig. 8, it is backed away from this projected, normal position by engagement of its outer end against end wall 59 of the valve casing. As movement of actuator yoke 12d in valve opening direction 60 commences, closure plate 12c will remain fixed in this closed position, under the yielding pressure of the spring loading means, until the lost motion clearance of stop means 58c, 58d is taken up, whereupon it will be picked up by arms 51d and carried along with yoke 12d to any selected position of opening movement. While the lost motion is being taken up, levers 37d will be spread apart by the camming action of arms 51d against lugs 63, thus spreading the valve seats 27 away from contact with closure plate 12c. As the movement of yoke 12d, carrying closure plate 12c along with it, continues, the valve seats will be maintained in their spread apart positions by the action of arms 51d sliding between lugs 63.

During valve closing movement, closure plate 12c will be carried by yoke 12d in its projected position until its outer end engages end wall 59 of the casing, whereupon it will be arrested in the closed position while yoke 12d continues to advance, bringing slots 64 into register with lugs 63 and allowing the latter to enter the slots so that levers 37d will be moved toward each other by the yielding pressure of springs 29, transmitted through sleeves 26 and studs 42d. Thereupon, valve seats 27 will reengage closure plate 12c under the spring pressure, sealing the valve.

The preferred form of the invention

In Figs. 11–16, I have shown a preferred embodiment of the invention, constructed the same as the valve shown in Figs. 8–10, with the exception of the following improvements:

Yoke section 12e of the gate is slidably mounted between ways 33e (Figs. 11, 12, 16) in the form of raised flats surrounding the openings at the inner extremities of cylinders 25f, merging with the wall 59e at the end of the casing 10e, having side margins defined by the inner walls of actuator pockets 36e, having an inner end extremity defined partially by an arcuate portion 25e of cylinder 25f, and having lateral end extremities which are cut back toward the center of cylinder 25f to provide corner clearance spaces 71 (Fig. 12). Yoke section 12e has trapezoidal stub arm portions 51e to which are rigidly secured actuator cams 37e. The areas of stub arms 51e lying inwardly of actuator cams 37e, in the closed position of the gate, are received and slidable between ways 33e. Likewise, the side marginal portions of closure plate 12f are received and slidable between ways 33e in the closed position of the valve, and the outer end extremity of closure plate 12f, as indicated in broken lines in Fig. 12, remains between arcuate portions 25e of ways 33e in the fully opened position of the valve. In the open position, the stub arms 51e have been completely withdrawn from between ways 33e, but are slidably supported and maintained in a common plane with closure section 12f, by slidable engagement of actuator cams 37e in extensions 36f of actuator pockets 36e, the extensions 36f having parallel bottom walls for closely embracing actuator cams 37e (Fig. 14).

In the open position of the valve, the inner end of closure plate 12f is supported upon yoke section 12e by means of slide bars 72 attached, as by means of rivets 73, to a narrowed neck portion 79 of closure plate 12f and projecting laterally beyond said narrowed neck portion 79 into embracing association with stub arms 51e. Such embracing association permits a limited lost motion between closure section 12f and yoke section 12e, to effect the characteristic operation above described in connection with the valves of Figs. 6, 7 and Figs. 8–10.

A lost motion connection between closure plate 12f and yoke section 12e is provided by fingers 58e projecting outwardly from the inner extremity of narrowed neck portion 79, and engageable with stop fingers 58f which constitute the inner extremities of stub arms 51e. Closure plate 12f has diagonally offset margin portions conforming roughly to the outline of valve throat cylinders 25f and extending therebeyond sufficiently to effect sealing contact with valve seats 27 in the fully closed position of the valve. Stub arms 51e are tapered from fingers 58f to their ends, to match the contour of said offset margin portions of closure plate 12f.

The inner extremity of narrowed neck portion 79 of closure plate 12f is, in the closed position of the gate, slightly spaced from the adjacent edge of cross member 52e of yoke 12e. A bow spring 54e is disposed in the slot 74 thus defined between these parts and is interposed under flexure between said parts; with its central portion secured to cross member 52e as by means of a clip 55e, and with its respective ends bearing against fingers 58e to urge closure plate 12f outwardly as indicated by arrow 57, whereby to maintain the valve plate stationary in the closed position while yoke 12e retracts therefrom during the initial stage of valve opening movement. The closed position of closure plate 12f is defined by engagement of its outer end against stop lugs 59f projecting inwardly from end wall 59e.

Actuator cams 37e (Figs. 13–15) are of telescoping construction, each including a bifurcated section 75 and an extension section 76 (Fig. 14) embraced between the furcations of section 75 and having a slot 77 receiving a pin 78 mounted in the outer ends of said furcations. Each of the actuator section 75, 76 has a wide body portion 40e with parallel sides to ride between rollers 41 for maintaining the latter in spread relation. Bifurcated section 75 (and optionally, extension section 76) includes camming ramps 39e for spreading rollers 41, and includes a narrowed shank portion 38e which has a bifurcated end portion receiving and secured (as by welding) to the extremity of a respective stub arm 51e.

Each extension section 76 has at its outer end laterally projecting stop lugs 76a engageable against rollers 41 to arrest the retracting movement of section 76 while bifurcated sections 75 continue to move with yoke section 12e of the gate, in the opening movement of the valve. During closing movement, extension sections 76 may move ahead of bifurcated sections 75 (unless retarded by braking effect of rollers 41) until they contact end wall 59e, which will arrest such advancing movement.

I claim:

1. A gate valve which includes: an elongate casing having a transverse fluid passage and a longitudinal confined space formed therein, which passage and space are connected by a transverse slot and in communication with longitudinally extending ways provided in said casing; a gate movably mounted in said ways which when in a first position completely obstructs said fluid passage; rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; actuator means moved by said rotatable means which move said sleeves outwardly from said gate as said gate starts to travel from said first to said second position, said actuator means permitting said spring means to return said sleeves to fluid sealing positions with said gate as said gate completes the return to said first position from second position; and pressure responsive valve means that permits fluid to bleed from said fluid passage into said confined space when the pressure on said fluid exceeds a predetermined maximum value.

2. A gate valve which includes: an elongate casing having a transverse fluid passage and a longitudinal confined space formed therein, which passage and space are connected by a transverse slot and in communication with longitudinally extending ways provided in said casing; a gate movably mounted in said ways which when in a first position completely obstructs said fluid passage; rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; cam means operatively associated with said sleeves actuated by movement of said rotatable means, which cam means moves said sleeves outwardly from said gate as said gate starts to move from said first to said second position, and permits said spring means to return said sleeves to a fluid sealing position with said gate as said gate completes moving from said second to said first position; and pressure relief means that permits fluid to escape from either side of said gate in said fluid passage into said confined space when the pressure on said fluid exceeds a predetermined maximum value.

3. A gate valve which includes: an elongate casing having a transverse fluid passage and a longitudinal confined space formed therein, which passage and space are connected by a transverse slot and in communication with longitudinally extending ways provided in said casing; a gate movably mounted in said ways which when in a first position completely obstructs said fluid passage; rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; an elongate cam having two oppositely disposed tapered portions that is movably mounted in a longitudinally extending pocket formed in said casing; means for causing said cam to move in conformity with said gate upon actuation of said rotatable means; means mounted on said sleeves which movably engages said tapered cam portions when said gate is closed, with movement of said gate from said first position toward said second position causing said sleeves to move outwardly from fluid sealing contact therewith due to such movable engagement, which movable engagement permits said spring means to return said sleeves to a fluid sealing position with said gate as said gate returns from said second to said first position; and pressure relief means that bleed fluid from said fluid passage into said confined space when pressure on fluid in said passage exceeds a predetermined maximum value.

4. A gate valve which includes: an elongate casing having a transverse fluid passage and a longitudinal confined space formed therein, which passage and space are connected by a transverse slot and in communication with longitudinally extending ways provided in said casing; a gate movably mounted in said ways which when in a first position completely obstructs said fluid passage; rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; a vertically bifurcated elongate cam having two oppositely disposed tapered portions from which parallel edges extend, said cam being movably mounted in a longitudinally extending pocket formed in said casing; means for maintaining said cam in fixed relationship with said gate; an elongate cam extension of the same height as said cam having a slot formed lengthwise therein, which extension has two longitudinally parallel edges and is adapted to be slidably disposed in the bifurcated portion of said cam; a pin transversely extending across said bifurcation, which pin slidably engages said slot; means mounted on said sleeves for movably engaging said tapered cam portions when said gate is closed, said tapered portions causing said sleeves to move outwardly from said gate as it starts to move from said first to said second position, said sleeves being in their maximum outer positions when said cam engaging means contacts the parallel edges of said cam during the first part of said gate movement, said sleeves being held in said maximum outer positions during the last part of said trip from said first to said second position by said cam engaging means when it engages said parallel edges of said extension as said extension moves toward said rotatable means due to said pin in one end of said slot, said sleeves also being held in an outwardly disposed position by said cam and extension when said gate is moved from said second toward said first position until said cam engaging means traverses said tapered portions, permitting said spring means to force said sleeves into fluid sealing contact with said gate as said gate assumes a complete passage obstructing position.

5. A gate valve which includes: an elongate casing having a transverse fluid passage and a longitudinal confined spaced formed therein, which passage and space are connected by a transverse slot and in communication with longitudinally extending ways provided in said casing; a gate movably mounted in said ways which when in a first position completely obstructs said fluid passage; rotatable means which moves said gate from said first position to a second non-obstructing position by no more than half a revolution theref, and by no more than half a revolution, returns said gate from said second to said first position; two fluid sealing sleeves slidably mounted in said passage on opposite sides of said gate; spring means that at all times urge said sleeves inwardly into fluid sealing contact with said gate; an elongate cam having two oppositely disposed tapered portions from which two parallel edges extend, said cam being movably mounted in a longitudinally extending pocket formed in said casing; means for maintaining said cam in fixed relationship with said gate; an elongate cam extension of the same height as said cam, which extension has two parallel edges and may be disposed in said pocket adjacent said cam; lost motion means connecting said cam and extension; roller means rotatably mounted on said sleeves which engage said tapered cam portions when said gate is in said first position, which roller means moves said sleeves outwardly as said rotating means starts to move said gate from said first to said second position until said roller means engages said parallel cam edges when said sleeves are at their maximum outer positions, said sleeves being so maintained during the last part of such gate movement when said lost motion means moves said cam extension means into a roller means engaging position, said sleeves remaining in said maximum outer positions until said rotating means moves said cam and extension into positions whereby said roller means engages said tapered portions, and said springs means forces said sleeves into fluid sealing contact with said gate as said roller means reaches the low points of said tapered portions.

6. A gate valve which includes: a casing formed with a fluid passage extending therethrough; a gate slidably mounted in said fluid passage, said gate completely obstructing said fluid passage when in a first position, and permitting fluid flow through said passage when in a second position; rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; actuator means moved by said rotatable means which move said sleeves outwardly from said gate as said gate starts to travel from said first to said second position, said actuator means permitting said spring means to return said sleeves to fluid sealing positions with said gate as said gate completes the return to said first position from said second position; and pressure responsive valve means that permits fluid to bleed from said fluid passage on either side of said gate into a confined space in said casing when said gate is closed, with said space communicating with said fluid passage only when said gate is closed.

7. A gate valve which includes: a casing formed with a fluid passage extending therethrough; a gate slidably mounted in said fluid passage, said gate completely obstructing said fluid passage when in a first position, and permitting fluid flow through said passage when in a second position, rotatable means which moves said gate from said first position to a second non-obstructing position by no more than half a revolution thereof, and by no more than half a revolution, returns said gate from said second to said first position; two fluid sealing sleeves slidably mounted in said passage on opposite sides of said gate; spring means that at all times urge said sleeves inwardly into fluid sealing contact with said gate; actuator means moved by said rotatable means which move said sleeves outwardly from said gate as said gate starts to travel from said first to said second position, said actuator means permitting said spring means to return said sleeves to fluid sealing positions with said gate as said gate completes the return to said first position from said second position.

References Cited in the file of this patent

UNITED STATES PATENTS

| 2,030,458 | McKellar | Feb. 11, 1936 |

FOREIGN PATENTS

| 629,628 | Germany | 1934 |
| 259,997 | Great Britain | Feb. 11, 1936 |